DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 732

T884,009

COMPRESSION UNIFORMITY ANALYSER

Malak E. Yunan, Wilmington, Del., assignor to E. I. du Pont de Nemours and Company, Wilmington, Del.

Filed Nov. 13, 1969, Ser. No. 876,594

Int. Cl. G01b *5/00*

U.S. Cl. 33—148

1 Sheet Drawing. 17 Pages Specification

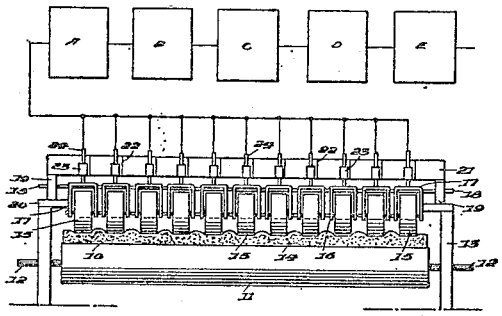

Thickness of a resilient batt is continuously detected as the batt travels in a linear path by apparatus comprising:

(1) a horizontal support;
(2) a plurality of weighted sensors responsive to compressed batt thickness;
(3) a plurality of transducers connected to said sensors; and
(4) a computational circuit connected to the transducer outputs comprising:
  (a) a first amplifier,
  (b) a first circuit means coupled to the output of said first amplifier for producing a signal representing the average output level of said first amplifier for a particular time interval,
  (c) a second amplifier for multiplying the difference between the transducer output signals and the output of said first amplifier,
  (d) operational amplifying and signal averaging means coupled to said second amplifier for producing an output proportional to the average mean deviation of the output of said second amplifier, and
  (e) a second circuit means coupled to said operational amplifying and signal averaging means for dividing the output thereof by a signal proportional to the output of said first circuit means, the output of said second circuit means being a representation of compressed batt thickness.

March 16, 1971 M. E. YUNAN T884,009
COMPRESSION UNIFORMITY ANALYSER
Filed Nov. 13, 1969
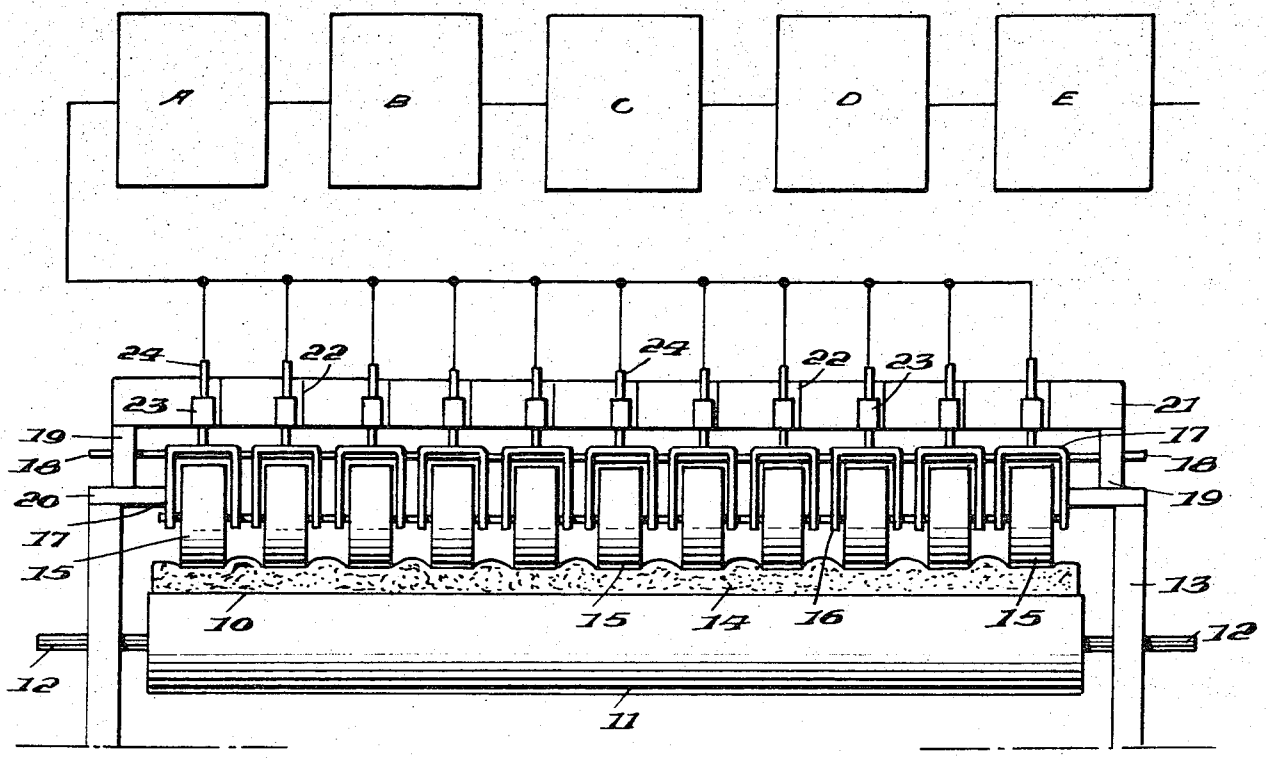
INVENTOR,
MALAK E. YUNAN,
BY William K. Moser
ATTORNEY